(12) United States Patent
Beelen et al.

(10) Patent No.: US 9,211,867 B2
(45) Date of Patent: Dec. 15, 2015

(54) WIPER BLADE

(75) Inventors: Hans Beelen, Herk de Stad (BE); Paul Criel, Sint-Truiden (BE); Eric Windmolders, Kermt (BE); Peter Saevels, Attenrode (BE); Mohamed Aznag, Scherpenheuvel-Zichem (BE); Peter De Block, Halen (BE); Jan Bonroy, Heverlee (BE)

(73) Assignee: Robert Bosch GmbH, Stuttgart (DE)

( * ) Notice: Subject to any disclaimer, the term of this patent is extended or adjusted under 35 U.S.C. 154(b) by 580 days.

(21) Appl. No.: 13/501,041

(22) PCT Filed: Oct. 8, 2010

(86) PCT No.: PCT/EP2010/065056
§ 371 (c)(1),
(2), (4) Date: Aug. 2, 2012

(87) PCT Pub. No.: WO2011/042519
PCT Pub. Date: Apr. 14, 2011

(65) Prior Publication Data
US 2012/0297565 A1    Nov. 29, 2012

(30) Foreign Application Priority Data

Oct. 9, 2009 (DE) .................. 10 2009 045 549 U
Oct. 7, 2010 (DE) .................. 10 2010 042 095

(51) Int. Cl.
B60S 1/38    (2006.01)

(52) U.S. Cl.
CPC .............. B60S 1/3891 (2013.01); B60S 1/381 (2013.01); B60S 1/3879 (2013.01); B60S 1/3881 (2013.01);
(Continued)

(58) Field of Classification Search
CPC .... B60S 1/3886; B60S 1/3887; B60S 1/3891; B60S 1/3881

USPC .......... 15/250.43, 250.361, 250.44, 250.452, 15/250.454, 250.453
See application file for complete search history.

(56) References Cited

U.S. PATENT DOCUMENTS 6,581,238 B1 * 6/2003 Sevellec .................. 15/250.351
7,159,268 B2 * 1/2007 Poton ........................ 15/250.32
(Continued)

FOREIGN PATENT DOCUMENTS

DE    10025710    8/2001
DE    10245693    4/2004
(Continued)

OTHER PUBLICATIONS

PCT/EP2010/065056 International Search Report dated Dec. 28, 2010 (Translation and Original, 6 pages).

*Primary Examiner* — Monica Carter
*Assistant Examiner* — Michael Jennings
(74) *Attorney, Agent, or Firm* — Michael Best & Friedrich LLP

(57) ABSTRACT

The invention is based on a wiper blade (12) with an elongated, spring-elastic carrier element (36) which is pre-curved concavely with respect to a vehicle window (22) and has at least one spring rail, and with a wiper strip (24) which is held by the carrier element (36), wherein the wiper blade (24) is secured relative to the carrier element (36) by an end cap (44) at least near to one end in the longitudinal direction (20), which end cap (44) has, on one longitudinal side, an opening which can be closed off by a flap (46) which can pivot about a pivoting axis (84) running in the longitudinal direction (20) into an open position and into a closed position. It is proposed that securing means (56, 58, 66) be provided on the end cap (44) or the flap (46), which securing means (56, 58, 66) can be moved by the activation of the flap (46) with the wiper blade (24) or with an element (120, 124, 128, 132, 136, 142) connected thereto into an operative connection or out of an operative connection, wherein the securing means (56, 58) are supported in the longitudinal direction (20) on the carrier element (36) or an element (52) which is permanently connected thereto, and said securing means (56, 58) and/or become detached therefrom.

6 Claims, 12 Drawing Sheets

(52) U.S. Cl.
CPC .............. *B60S 1/3886* (2013.01); *B60S 1/3887* (2013.01); *B60S 2001/382* (2013.01); *B60S 2001/3822* (2013.01)

(56) References Cited

U.S. PATENT DOCUMENTS

| | | | |
|---|---|---|---|
| 7,581,280 B2* | 9/2009 | Op't Roodt et al. | 15/250.43 |
| 7,823,247 B2* | 11/2010 | Poton | 15/250.32 |
| 7,832,047 B2* | 11/2010 | Herinckx et al. | 15/250.43 |
| 7,996,953 B2 | 8/2011 | Braun et al. | |
| 8,375,503 B2* | 2/2013 | Aznag | 15/250.201 |
| 8,745,813 B2* | 6/2014 | Ishida et al. | 15/250.361 |
| 2006/0107485 A1* | 5/2006 | Kim | 15/250.201 |
| 2006/0112511 A1* | 6/2006 | Op't Roodt et al. | 15/250.43 |
| 2008/0016643 A1* | 1/2008 | Braun et al. | 15/250.361 |
| 2008/0127442 A1 | 6/2008 | Jarasson et al. | |
| 2008/0289134 A1 | 11/2008 | Boussicot et al. | |
| 2010/0071148 A1* | 3/2010 | Wilms et al. | 15/250.43 |
| 2010/0101041 A1 | 4/2010 | Coemans et al. | |
| 2011/0126373 A1 | 6/2011 | Ishida et al. | |

FOREIGN PATENT DOCUMENTS

| | | | |
|---|---|---|---|
| JP | 2007529364 | | 10/2007 |
| KR | 1020090039788 | | 4/2009 |
| WO | WO 2008020003 | * | 2/2008 |
| WO | 2009056385 | | 5/2009 |
| WO | WO 2009056385 A1 | * | 5/2009 |

* cited by examiner

WIPER BLADE

BACKGROUND OF THE INVENTION

The invention is based on a wiper blade.

WO 2008/020003 discloses a wiper blade having an elongated, spring-elastic carrier element which is pre-curved concavely with respect to a vehicle window and which has at least one spring rail, and having a wiper strip which is held in a replaceable fashion by the carrier element. The wiper strip is permanently connected at one end to a thickened portion by means of which the wiper strip can be secured relative to the carrier element. This is done by virtue of the fact that the thickened portion can be laid on one end side of the spring rail or on a bridge which connects two spring rails, serving as a carrier element, to one another. In this position, the wiper strip is secured relative to the carrier element by an end cap. The latter can engage over the thickened portion and the bridge and secure them in position by releasable latching means. In the case of disassembly of the wiper strip of the wiper blade the latching means are released, with the result that after the removal of the end cap the wiper strip can be pulled out of the carrier element.

The thickened portion can be implemented by means of different configuration elements, for example by means of separate components which are connected to the wiper strip, or integrally formed-on parts which bring about a local increase in the cross-section of the cross-sectional profile of the wiper strip at the end of the wiper strip. The first-mentioned measures include clamps made of metal or plastic or a combination of these materials, for example plastic-coated metal clamps or bracket-shaped plastic parts which are attached to the wiper strip by metal clamps. In the simplest case, staples are sufficient, the limbs of said staples being pressed, while pointing towards the wiper lip, by the upper part of the head strip and being bent over toward the web which runs between the longitudinal grooves for the spring rails.

Another possibility is that the staple runs in the longitudinal direction of the wiper strip, while its limbs penetrate the web between the longitudinal grooves transversely with respect to the longitudinal direction and are bent over inward on the opposite side of the web. If the thickened portion is integrally formed onto the wiper strip, it can entirely or partially fill the longitudinal grooves in the end region thereof. In addition, said thickened portion can protrude as a bead or projection beyond the normal cross-sectional profile of the wiper strip. These may be integrally injection-molded-on or extruded-on parts of the wiper strip which are composed of the same material or of similar materials. Basically it is also possible for these parts to be connected as separate parts by bonding, vulcanizing or welding to the wiper strip.

According to one configuration of the invention, an opening which can be opened and closed is provided on at least one end cap. A flap which closes off the opening is used for this purpose. The flap is connected to the cap via a film joint whose pivoting axis runs in a longitudinal direction of the wiper blade. In the closed state, the flap latches with a latching edge on a connecting web of the end cap, wherein the end side of the flap, which faces the end of the wiper blade, bears with a fin on the facing end side of the bridge of the carrier element, with the result that the carrier element is secured relative to the wiper strip with the spring rails by means of the end cap. The external contour of the closed flap finishes flush with the face against which there is a flow or the throat of the end cap, with the result that no wind noises are produced at the end cap even in the case of high speed vehicles.

DE 10 2004 051 467 A1 discloses a wiper blade. Its carrier element comprises two spring rails which run parallel to one another and which are connected to one another at their ends by a bridge. In order to accommodate a wiper strip, the spring rails form a longitudinal gap, with the result that the wiper strip can be threaded onto the carrier element in the longitudinal direction. The wiper strip is secured in the longitudinal direction relative to the carrier element by end caps. The latter have an element with a mandrel which is pressed into a head strip of the wiper strip at the end of the mounting process. In the mounted state, the mandrel bears against the end side of the bridge which faces away from the end of the wiper strip. In one exemplary embodiment, the mandrel is located on a spring tongue which is pressed against the head strip by a flap with an eccentric. The pivoting axis of the flap runs transversely with respect to the longitudinal direction of the wiper blade. In another embodiment, the mandrel is arranged directly on the flap, wherein the pivoting axis of the flap is provided in the vicinity of the outer end wall of the end cap.

DE 100 25 710 A1 discloses a wiper blade of the flat bar design which has a rubber-elastic wiper strip with a wiper lip. Between the wiper lip and a head strip lateral longitudinal grooves are provided into which two spring rails which are pre-curved concavely with respect to the wiper lip are inserted as a carrier element. Said spring rails are held together by bridges at their ends and by a central connecting element. The bridges have as securing means an integrally formed-on projection which has at its free end at least one projection which is directed toward the head strip. During assembly, the projection is bent against the head strip with the result that the projection engages in the head strip and secures the spring rails in the longitudinal direction relative to the wiper strip. The bridges are finally covered with end caps.

A similar wiper blade is known from DE 102006059077. In this context, a securing spring which points in the longitudinal direction and which is attached to the bridge presses with a v-shaped profile, which runs transversely in the longitudinal direction, against a head strip of the wiper strip and secures the latter relative to the carrier element. The pressure on the head strip can be amplified by suitable devices in the end cap, on which devices the securing pin is supported.

DE 102 45 693 A1 discloses a wiper blade which has, as a carrier element, two spring rails which run parallel and which are connected to one another at each of their ends by a bridge. In addition, securing means are provided which secure the wiper strip relative to the spring rails. In order to dismount the wiper strip, the securing means can easily be released. They are connected at one end to the bridge and at the other end to the wiper strip via a materially joined connection, a frictionally locking connection and/or a positively locking connection. In one exemplary embodiment, a mandrel engages through a guide bore in the bridge into the wiper strip and is secured in the mounting position by an end cap which latches to the bridge by means of a spring element. The spring element can be released by an element which can be operated externally, with the result that the end cap and the mandrel can be released in order to change the wiper strip. In the mounted state, the end cap is supported by a closed end side pointing to the end of the wiper blade on the assigned end side of the bridge. Another exemplary embodiment shows a securing unit which is fabricated from sheet metal and which is pressed into the wiper strip by a mandrel which is bent with respect to the wiper strip. When the spring rails are mounted, the securing unit is pushed under the bridge and latched between the stop faces and a spring tongue on the bridge. The spring tongue can be pressed into a release position after the removal of the end cap, with the result that the spring rails can be dismounted.

SUMMARY OF THE INVENTION

According to the invention, securing means are provided on the end cap or the flap, which securing means can be moved, through activation of the flap, into or out of an operative connection with the wiper strip or with an element connected thereto, wherein the securing means are supported in the longitudinal direction on the carrier element or on an element which is permanently connected thereto and/or become detached from said carrier element or an element which is permanently connected thereto. The measures according to the invention permit the wiper strip to be reliably secured in a variety of ways at just one end relative to the carrier element with the result that during the operation of the wiper blade the carrier element cannot move out of the wiper strip. This is particularly advantageous if the securement occurs at one end of the wiper blade which describes a large circular arc during operation and is therefore subject to the relatively large centrifugal force. At the same time, the relative movement over the length of the wiper blade between the wiper strip and the carrier element and which is necessary for unforced bending of the wiper strip in order to be able to follow the different curvatures of the window pane is otherwise not impeded.

According to one refinement of the invention, a securing means which runs transversely with respect to the head strip of the wiper strip is provided on the inside of the flap, which securing means presses on the head strip in the closed state of the flap and is supported in the longitudinal direction on a bridge which connects to one another two spring rails which run parallel one next to the other and serve as a carrier element. The securing means act as a pressure element by penetrating a certain amount further into the elastic head strip of the wiper strip. Said securing means can also be embodied as a cutting blade which tapers in a wedge shape toward the head strip and which can cut more deeply into the head strip.

In addition, further securing means in the form of supports which are arranged on both longitudinal sides of the head strip and are supported on the carrier element when the flap is closed can be provided on the inside of the flap.

In addition, the wiper strip can advantageously have, in the end region of its head strip, a transverse groove into which at least one blocking element which is integrally formed onto the flap engages when the flap closes. The blocking element can also be embodied as a separate component in the form of a bolt which is inserted into the transverse groove during mounting and is then permanently connected to the carrier element.

BRIEF DESCRIPTION OF THE DRAWINGS

Further advantages will emerge from the following description of the drawing. In the drawing, exemplary embodiments of the invention are illustrated. The drawing, the description and the claims contain numerous features in combination. A person skilled in the art will expediently also consider the features individually and place them together to form further appropriate combinations.

In the drawing.

DETAILED DESCRIPTION

Figure 1:
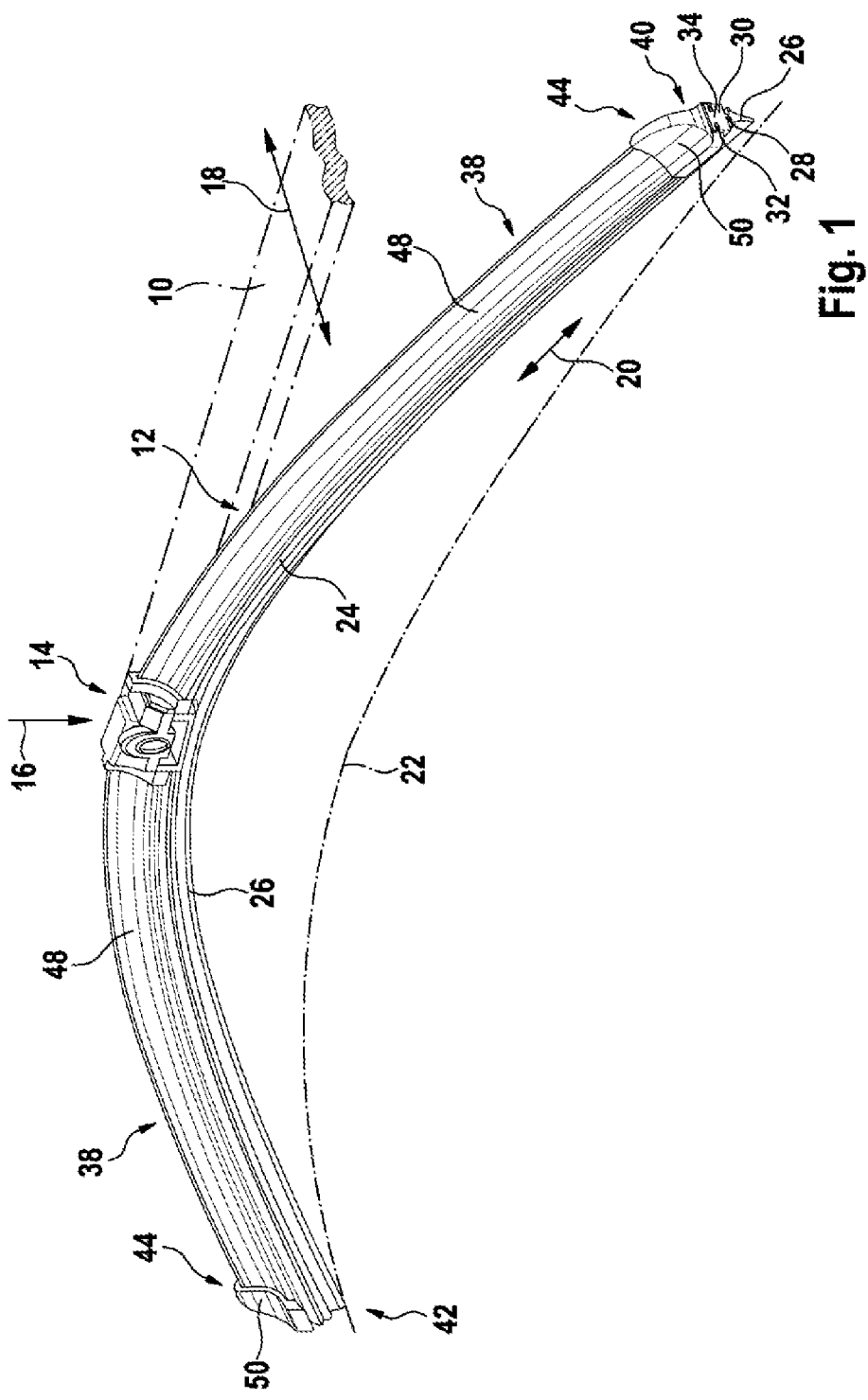
FIG. 1 shows a perspective illustration of a wiper blade.
Figure 2:
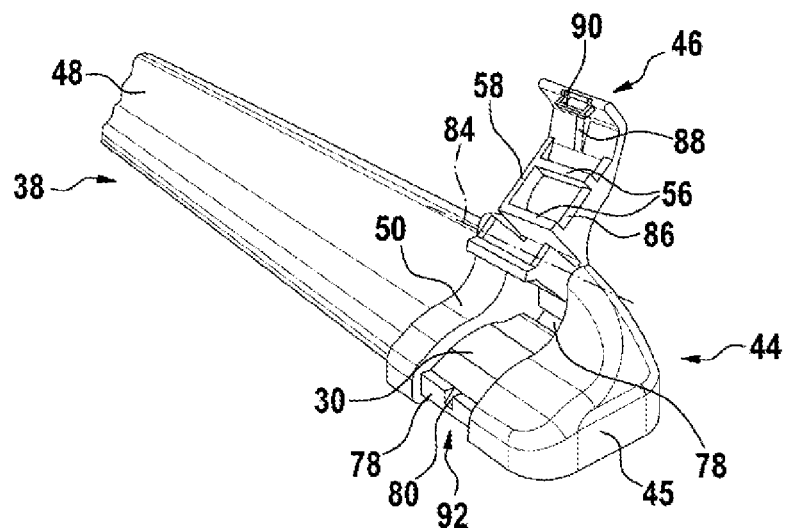
FIG. 2 shows a perspective illustration of a wiper blade end having an end cap with a flap on an enlarged scale.
Figure 3:
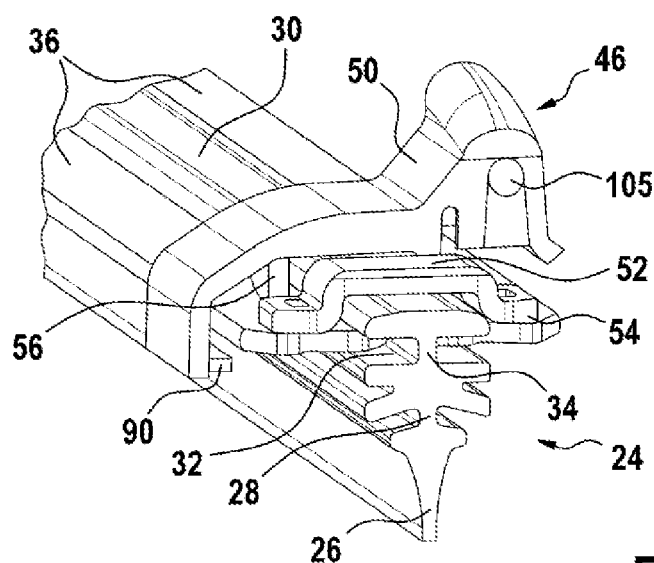
FIG. 3 shows a perspective illustration of a wiper blade end without a spoiler part and without a base part of the end cap.
Figure 4:
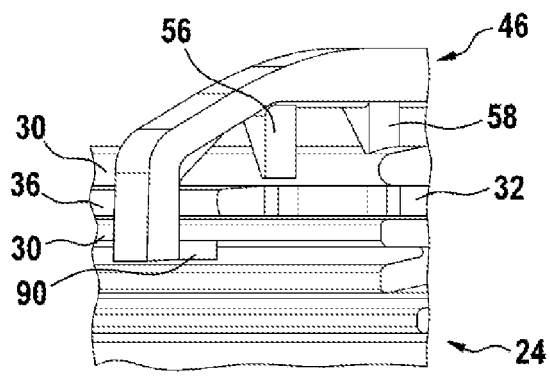
FIG. 4 shows a variant of FIG. 3, FIG. 5 and FIG. 6 show a further variant of FIG. 3.

A wiper blade 12 has a spring-elastic carrier element 36 which is elongated in the form of a belt and is in the form of two spring rails running parallel to one another at a distance from one another (FIG. 1 and FIG. 3). Said spring rails are inserted by their inner edge strips, facing one another, into longitudinal grooves 32 in a head strip 30 of a wiper strip 24, while their outer edge strips protrude laterally a certain amount from the longitudinal grooves 32. Between the longitudinal grooves 32 there is a web 34. Toward a vehicle window 22, a wiper lip 26 adjoins the head strip 30 via a tilting web 28, said wiper lip 26 sliding over the vehicle window 22 during a wiping movement in the direction of a double arrow 18. For this purpose, a wiper arm 10 pushes the wiper blade 12 via a connecting device whose wiper-blade-side part 14 can be connected in an articulated and releasable fashion to the wiper arm 10 while said wiper arm 10 is securely seated in the central region of the wiper blade 12 on the carrier element 36 thereof. At the same time, the wiper arm 10 loads the wiper blade 12 in the direction of the vehicle window 22 with a pressing force 16. The wiper arm 10 and the vehicle window 22 are indicated by dot-dash lines. During operation, the ends 40, 42 of the wiper blade 12 describe circular arcs during a pivoting movement about a wiper shaft (not illustrated) in the direction of the double arrow 18, wherein the inner end 40 describes an inner circular arc and the outer end 42 describes an outer circular arc.

The greatest degree of curvature of the vehicle window 22 is less than the curvature of the still unloaded wiper blade 12 which bears with its two ends 40, 42 against the window pane 22 (FIG. 1). Under the pressing force 16, the wiper blade 12 bears with its wiper lip 26 over its entire length against the window pane 22. In this context, a tension builds up in the spring-elastic carrier element 36 which is fabricated from metal or plastic, said tension ensuring that the wiper strip 24 or the wiper lip 26 bears satisfactorily over its entire length against the window pane 22, as well as ensuring that the pressing force is distributed uniformly.

On both sides of the wiper-blade-side connecting element 14 there are spoiler parts 38 which adjoin in the longitudinal direction 20 and are guided on the carrier element 36. End caps 44 are provided at the ends 40, 42 of the wiper blade 12, said end caps 44 likewise being guided on the carrier element 36, latching thereon and covering the ends of the spoiler parts 38. The spoiler parts 38 have a flow profile 48, while the flow profiles of the end caps 44 are characterized by 50.

One of the end caps 44, preferably that at the outer end 42, serves to secure the wiper strip 24 relative to the carrier element 36. Said end cap 44 has a base part 45 whose outwardly pointing end is connected via bars 78 to a part pointing to the spoiler part 38. In the region of the bars 78, a flap 46 is mounted so as to be pivotable about a pivoting axis 84 running in the longitudinal direction 20. The pivoting axis 84 is formed by bearing elements 105 on the flap 46 and by bearing elements 106 on the base part 45. The bearing elements 105 and 106 are spigots which fit into corresponding bearing bores in the respective other part.

The flap 46 closes an opening in the base part 45. It has a latch 90 on an edge which runs parallel to the pivoting axis 84 at a distance therefrom. In the closed state of the flap 46, the latch 90 latches in a corresponding cutout 92 in the associated bar 78. The flap 46 also has, for the purpose of stiffening, and in the region of the latch 90, a centering fin 88 which in the closed state engages in a groove 80 in the associated bar 78. On the inside of the flap 46 there are transverse struts 86, at least one of which is embodied as a securing means in the form of a cutting blade 58. The latter presses, in the closed state of the flap 46, on the top side of the head strip 30, as a result of which the latter is secured in the longitudinal direction 20 with respect to the flap 46, which is in turn secured relative to the carrier element 36 by the base part 45.

The carrier element 36, which can basically also be composed of a spring rail which is accommodated in a central longitudinal duct of the head strip 30, is composed in the illustrated exemplary embodiments of two spring rails which run parallel to one another and are connected to one another at their ends by a bridge 52 by feet 54 of the bridge 52 being attached to the carrier element 36 by suitable means, for example by welding, bonding, riveting or the like. In the closed state of the flap 46, the securing means 58 bear against the end side of the bridge 52 which faces the spoiler part 38. The wiper strip 24 is therefore secured in a first direction relative to the carrier element 36 by the securing means 58 of the flap 46.

Figure 5:
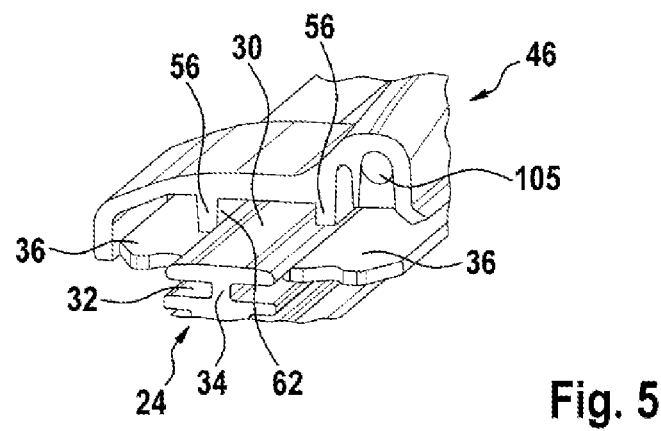
Figure 6:
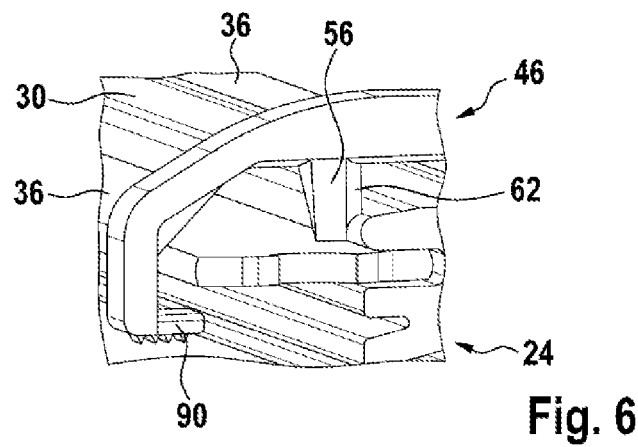
Figure 7:
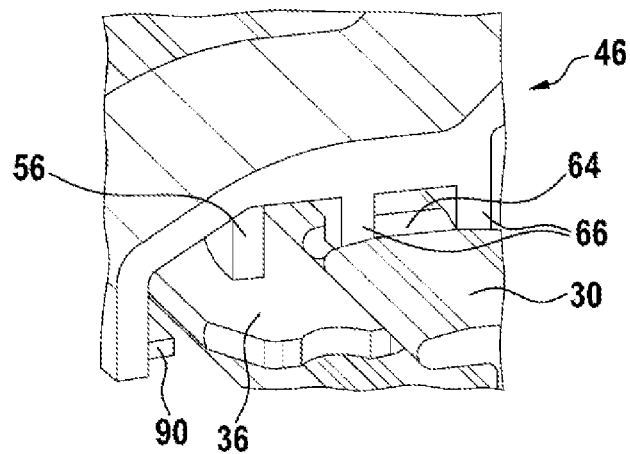
FIG. 7 shows a further variant of FIG. 3.

In addition or alone, securing means 56 may be provided in the form of supports which are supported on both sides of the head strip 30 on the carrier element 36, and can bear on the feet 54 of the bridge 52 on the same side as the securing means 58. On the side lying opposite the support, the carrier element 36 is led through guide strips 60. According to a further embodiment, the supports 56 can have lateral cutting blades 62 which face the head strip 30 and cut into the edge regions of the head strip 30 when the flap 46 closes (FIGS. 5 and 6).

In the second direction which is opposed to the first direction, the carrier element 36 is secured to the wiper strip 24 by a further transverse strut 86 of the flap 46 or of the base part 45, wherein the transverse strut 86 bears on the side of the bridge 52 or the feet thereof 54 lying opposite the securing means 56, 58 or bears against the end sides of the carrier element 36.

In a further embodiment, the place of the securing means 58 is taken by securing means 66 in the form of blocking elements which are integrally formed onto the inside of the flap 46 and engage in a transverse groove 64 in the head strip 30. The latter is therefore secured with respect to the end cap 44, which for its part latches with the carrier element 36, for example by means of suitable latching means, on the bridge 52 or in lateral cutouts 140.

Figure 8:
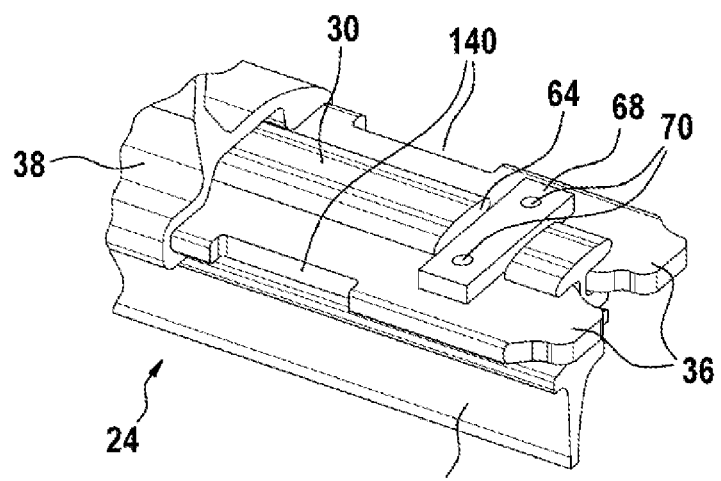
FIG. 8 shows a variant with a transverse groove in the head strip of the wiper strip.
Figure 9:
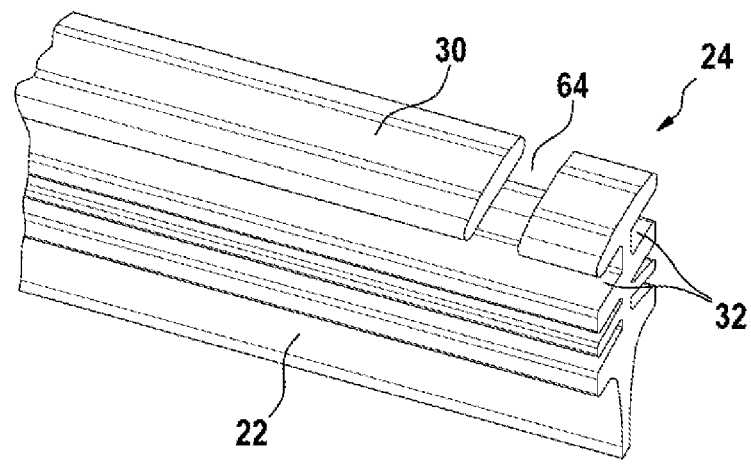
FIG. 9 shows a wiper strip according to FIG. 7 or FIG. 8.
Figure 10:
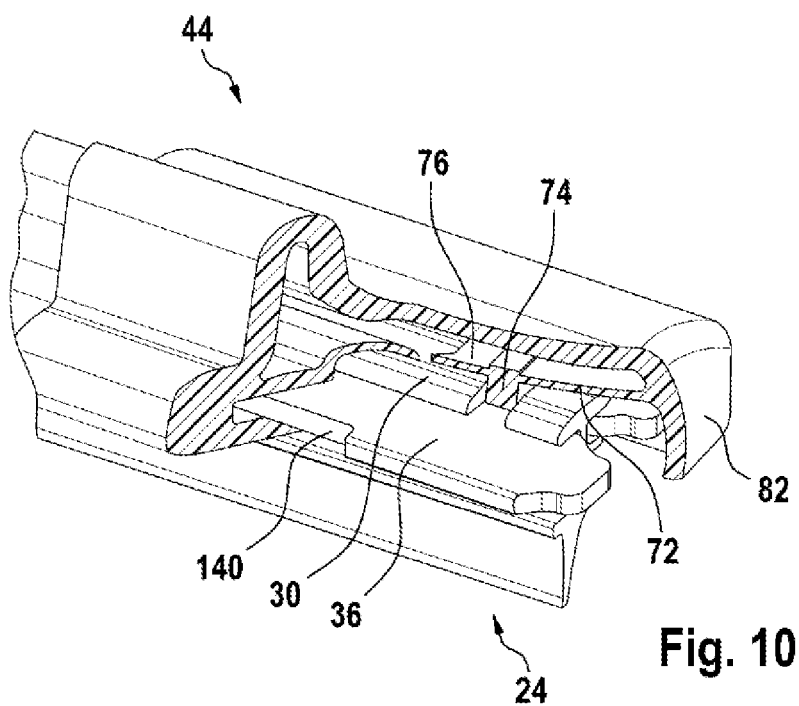
FIG. 10 shows a variant of FIG. 8.

In the embodiment according to FIG. 8, a fitting bolt 68, which is attached to the carrier element 36 at attachment points 70 by means of notched pins, rivets, welding points or the like, is located in the transverse groove 64. The wiper strip 24 is therefore secured directly to the carrier element 36 via the bolt 68. Said wiper strip 24 can, however, as shown by the embodiment according to FIG. 10, also be indirectly secured by a locking block 74 by virtue of the fact that the locking block 74 engages in the transverse groove 64 in the head strip 30. The locking block 74 is arranged by means of a spring tongue 72 which is integrally formed onto an end wall 82. A stop 76 which protrudes over the locking block 74 bears against the back of the head strip 30 as soon as the locking block is latched in to the transverse groove 64. The wiper strip 24 is secured with respect to the carrier element 36 by means of the base part 45 of the end cap 46 which is latched in a conventional fashion to the carrier element 36.

Figure 11:
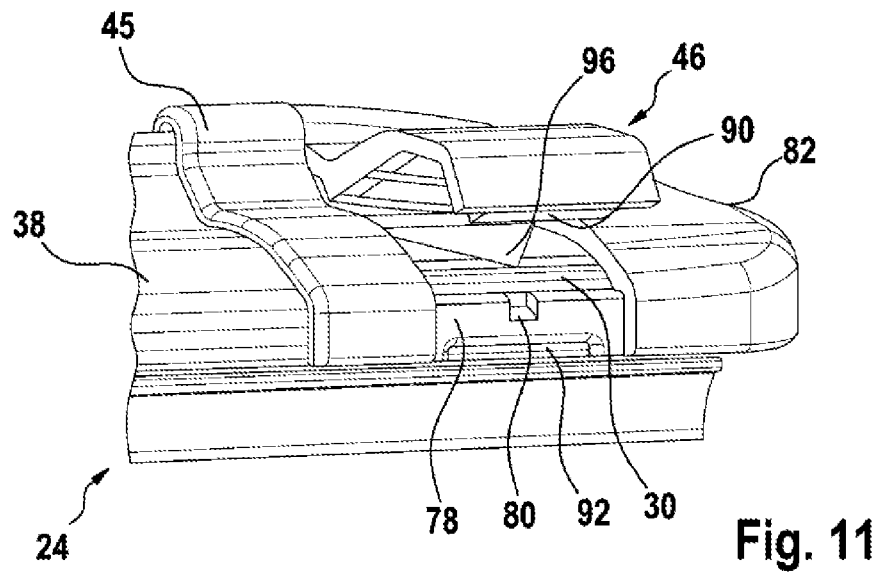
FIG. 11 shows a variant with a spring tongue with a projection.
Figure 12:
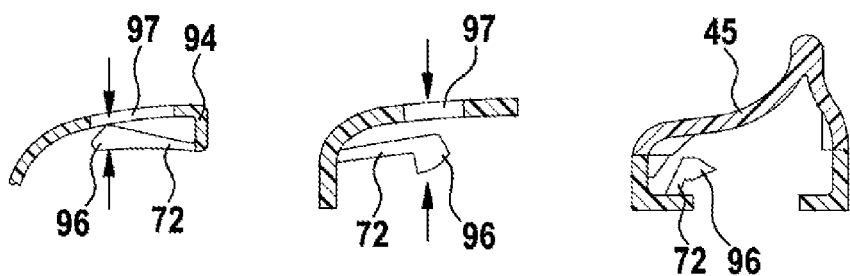
FIG. 12 shows variants of arrangements of the spring tongue according to FIG. 11.

In the embodiment according to FIG. 11, the place of the spring tongue 72 with a locking block 74 is taken by a spring tongue 72 with a projection 96. The spring tongue projects as far as the region of the flap 46 and is pressed against the head strip 30 by its projection 96 when the flap 46 closes, with the result that the projection 96 penetrates a certain amount into the head strip 30 or cuts into it. In FIG. 11, the spring tongue 72 is arranged on an edge of the base part 45 which is located on the opening for the flap 46 on the side toward the spoiler part 38. FIG. 12 shows variants in which the spring tongue 72 is integrally formed onto one of the longitudinal sides of the base part 45 and is activated by an element of the flap 46 through an opening 97 in an intermediate wall 94. In the third arrangement the spring tongue 72 is integrally formed onto the end wall 82 of the base part 45 and projects from there into the region of the flap 46.

Figure 13:
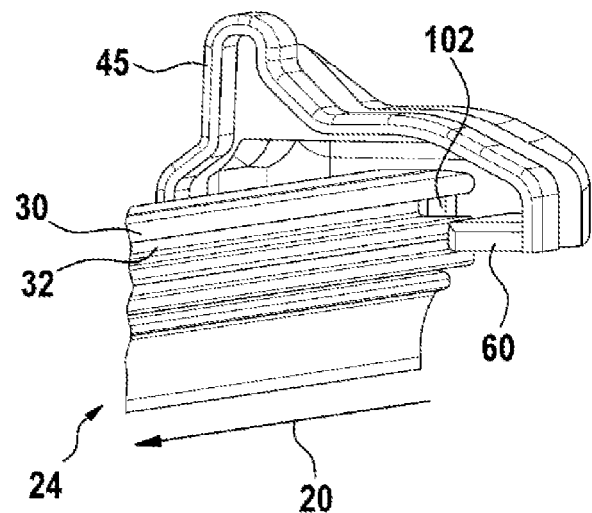
FIG. 13 shows a variant with securing arms on the inside of an end wall of the end cap.
Figure 14:
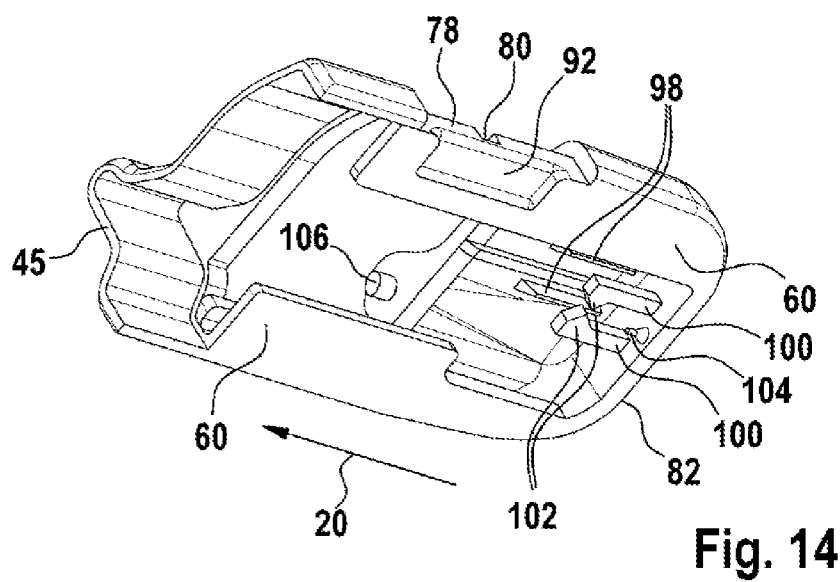
FIG. 14 shows a perspective illustration of an end cap according to FIG. 13 from below.

The configuration according to FIGS. 13 and 14 shows two securing arms 100 which are integrally formed onto the inside of the end wall 82 of the base part 45 in the longitudinal direction 20.

Said securing arms 100 engage, in the mounted state, a certain amount into the longitudinal groove 32 of the head strip 30 and hook with teeth 102 lying opposite one another at their ends into the web 34 formed between the longitudinal grooves 32. In addition, a short spigot 104, which is also directed in the longitudinal direction 20, penetrates the wiper strip 24 and supports it in a region in which the carrier element 36 is no longer effective. On the inside of the cover wall of the base part 45 there are guide ribs 98 which run approximately parallel to the securing arms 100 and form a lateral guide relative to the bridge 52, said cover wall forming the flow profile 50.

Figure 15:
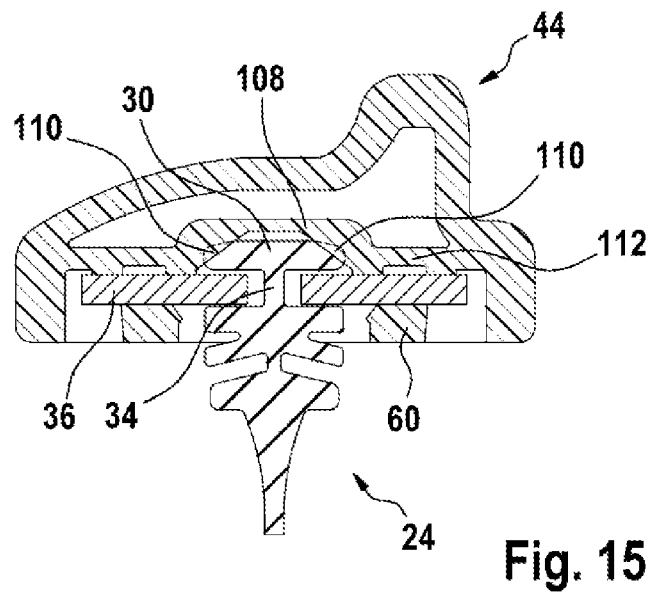
FIG. 15 shows a cross section through a wiper blade in the region of an end cap.
Figure 16:
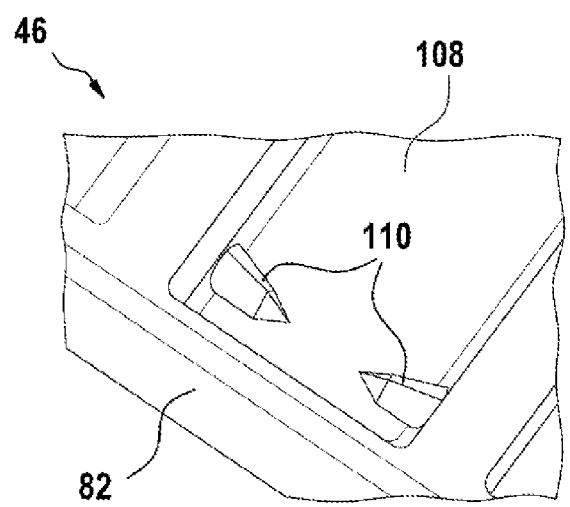
FIG. 16 shows a detail from FIG. 15 on an enlarged scale in a perspective view.

In the embodiment according to FIGS. 15 and 16, the end cap 44 has a longitudinal duct 108 which has a U-shaped cross section and is open towards the carrier element 36. The longitudinal duct 108 accommodates the head strip 30 which is pushed to the outer end 42 when it is mounted in the longitudinal duct 108 in the longitudinal direction 20. At the end of the longitudinal duct 108 or in the region of the flap 46, wedge-shaped pressure elements 110 are integrally formed onto the edges of the longitudinal duct 108. If the flap 46 is then closed or the wiper strip 24 is then pushed into the longitudinal duct 108 in the longitudinal direction 20, the head strip 30 is pressed against the carrier element 36 by the wedge-shaped pressure elements 110 and secured in this way.

In this context, the wedge-shaped pressure elements 110 generate pressing forces which are directed in the direction of the web 34.

Figure 17:
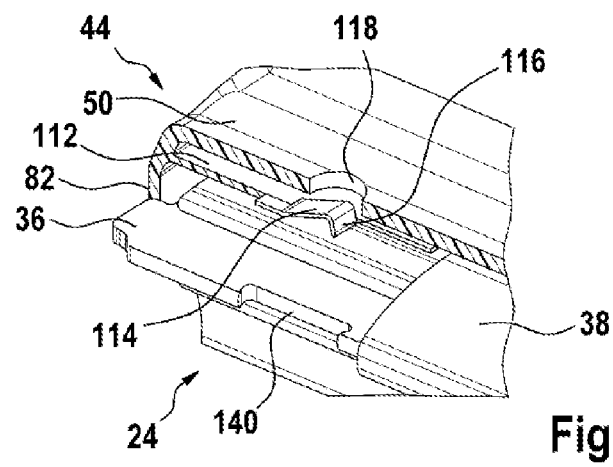
FIG. 17 to FIG. 19 show a variant with a locking hook on its intermediate floor of the end cap.
Figure 18:
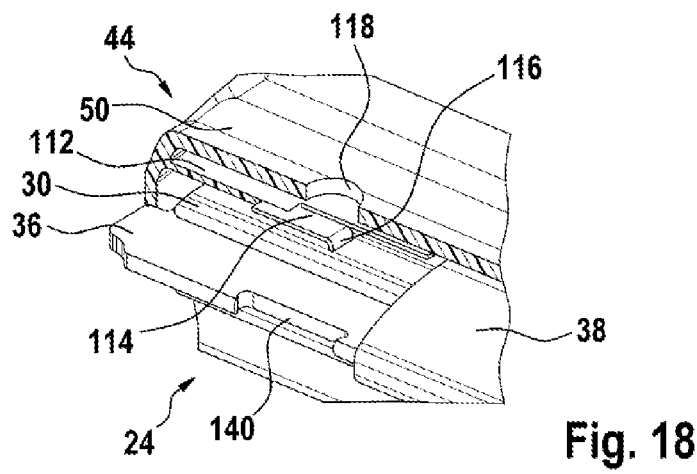
Figure 19:
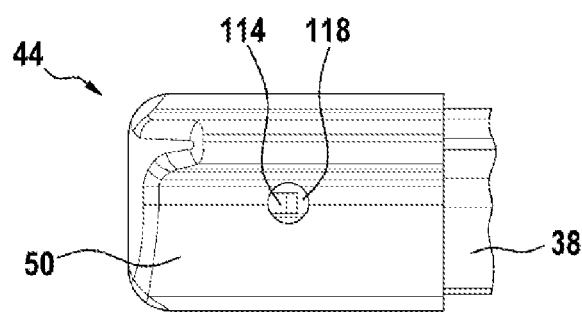
Figure 20:
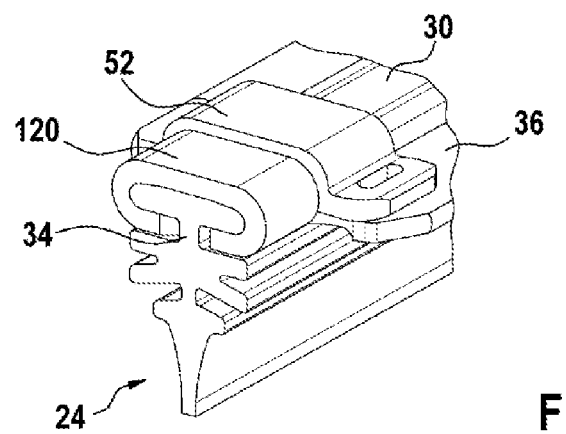
FIG. 20 to FIG. 27 show variants of elements which are attached to the head strip of the wiper strip.
Figure 21:
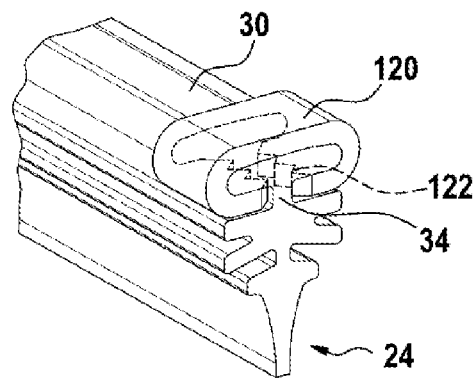

In the embodiment according to FIG. 17 to FIG. 19, the wiper strip is secured relative to the end cap 44 by a hook 114 made of sheet metal. Said hook 114 runs in the longitudinal direction 20 and is cast in an intermediate floor 112 of the end cap 44. During the mounting of the end cap 44, it bears against a lateral cutout 140 in the carrier element 36, while at the same time the end side of the carrier element 36 bears against the inside of the end wall 82 of the end cap 44. In this position, a bent end 116 of the sheet metal hook 114 is pressed into the head strip 30 through an opening 118 in the flow profile 50. The wiper strip 24 is therefore secured relative to the carrier element 36 by means of the sheet metal hook 114 of the end cap 44. The embodiments according to FIG. 20 to FIG. 27 are defined by separate elements which are permanently connected to the wiper strip 24 in the region of one end of the head strip 30. According to FIG. 20, such an element is a clamp 120 which embraces the head strip 30 from the back and engages with its limbs in the longitudinal grooves 32. In the process, teeth 122 penetrate the assigned longitudinal sides of the web 34.

Figure 22:
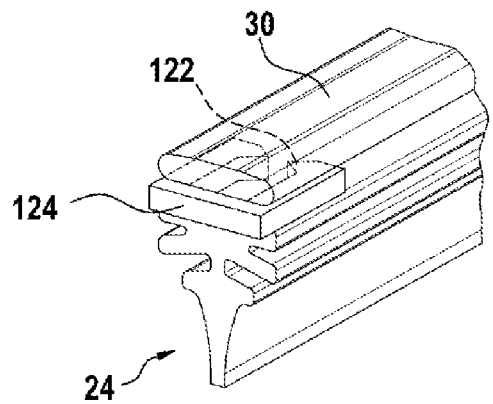
Figure 23:
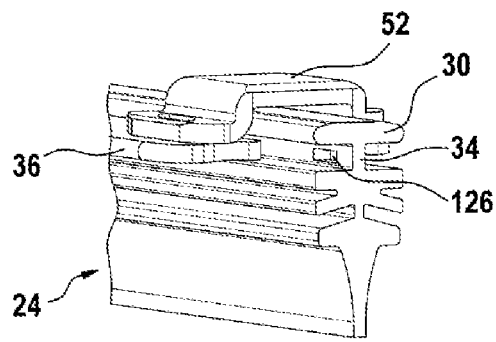
Figure 24:
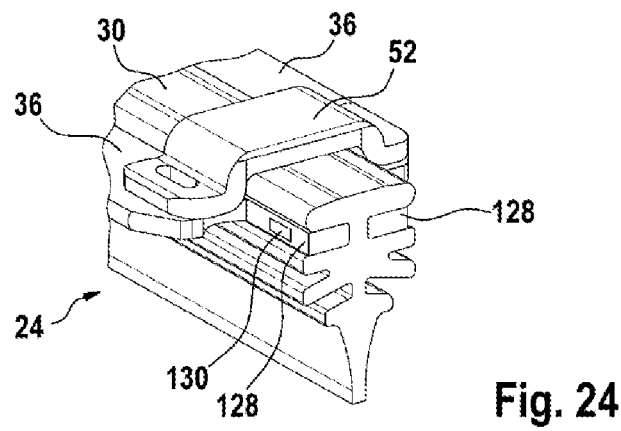
Figure 25:
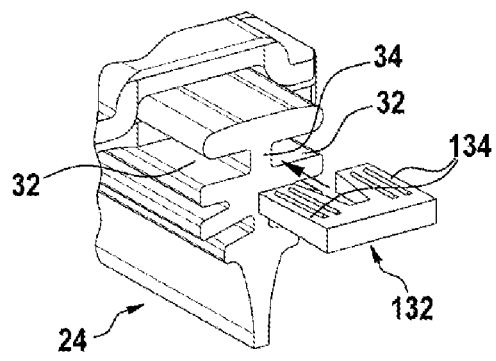

The embodiment according to FIG. 22 differs from the previously described embodiment in that a clamp 124 embraces the web 34 from the end side and engages with teeth 122 in the web 34. The embodiment according to FIG. 23 and FIG. 24 has filler elements 128 which are inserted into the ends of the longitudinal grooves 32. Two filler elements 128 which lie opposite one another are connected to one another by an opening 126 in the web 34 with at least one connecting element 130 in the form of a rivet pin, a clip or the like. The embodiment according to FIG. 25 similar to the embodiment according to FIG. 22, but the teeth 122 are missing, with the result that the U-shaped filler element 132 is connected in a materially joined fashion by its limbs 134, projecting into the longitudinal grooves 32, to the head strip 30 by means of ultrasonic welding, bonding or the like.

Figure 26:
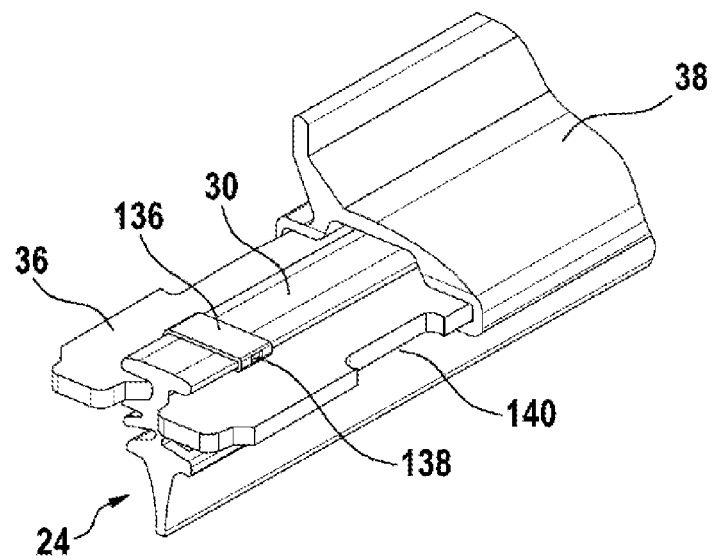
Figure 27:
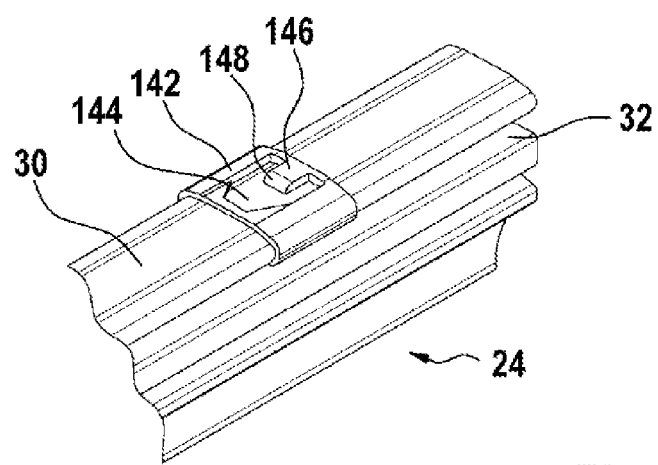

The embodiment according to FIG. 26 shows a sheet metal clamp 136 which embraces the head strip 30 from above. On its longitudinal sides, the clamp 136 has projections 138 which can be pressed laterally into the head strip 30. In a similar way, in the embodiment according to FIG. 27 a clamp 142 made of sheet metal embraces the head strip 30 from the back. Said clamp 142 has in its cover wall a window 144 into which a locking hook 146 projects in the longitudinal direction 20, the bent end 148 of which locking hook 146 is pressed into the head strip 30 during mounting.

The invention claimed is:

1. A wiper blade (12) having an elongated, spring-elastic carrier element (36) which is pre-curved concavely with respect to a vehicle window (22) and which has at least one spring rail, and having a wiper strip (24) which is held by the carrier element (36), wherein the wiper strip (24) is secured close to at least one end in a longitudinal direction (20) relative to the carrier element (36) by an end cap (44) which has, on one longitudinal side, an opening which can be closed off by a flap (46) which can pivot about a pivoting axis (84) running in the longitudinal direction (20), into an open position and into a closed position, characterized in that securing means (56, 58, 66) are provided on the end cap (44) or the flap (46), which securing means (56, 58, 66) can be moved, through activation of the flap (46), into or out of an operative connection with the wiper strip (24) or with an element (120, 124, 128, 132, 136, 142) connected thereto, wherein the securing means (56, 58, 66) are supported in the longitudinal direction (20) on the carrier element (36) or on an element (52) which is permanently connected thereto and/or become detached from said carrier element (36) or an element (52) which is permanently connected thereto, the securing means (58) including an elongate strut located on an inside of the flap, wherein when the flap (46) is in the closed position, the strut extends lengthwise in an elongate manner along a first, elongate direction that is perpendicular with respect to the longitudinal direction, and extends away from the flap (46) and toward a head strip (30) of the wiper strip (24) along a second, different direction that is perpendicular with respect to the longitudinal direction, the strut pressing along the second direction onto the head strip in the closed position of the flap.

2. The wiper blade (12) as claimed in claim 1, characterized in that the securing means (58) is supported in the longitudinal direction (20) on a bridge (52) which connects to one another two spring rails which run parallel one next to the other and serve as the carrier element (36).

3. The wiper blade (12) as claimed in claim 1, characterized in that additional securing means (56) are provided in the form of supports, which are supported on the carrier element (36) when the flap (46) is in the closed position, and are provided on an inside of the flap (46), each of the supports having an elongate structure extending parallel to the longitudinal direction.

4. The wiper blade (12) as claimed in claim 1, characterized in that the flap (46) has, on a longitudinal edge which is remote from the pivoting axis (84), a latch (90) which engages in a corresponding cutout (92) in a base part (45) of the end cap in the closed position of the flap (46).

5. The wiper blade (12) as claimed in claim 1, characterized in that the wiper strip (24) is secured relative to the carrier element (36) only at an end which describes an external circular arc during pivoting movement.

6. The wiper blade (12) as claimed in claim 1, wherein the strut is a cutting blade (58).

* * * * *